Figure 3:
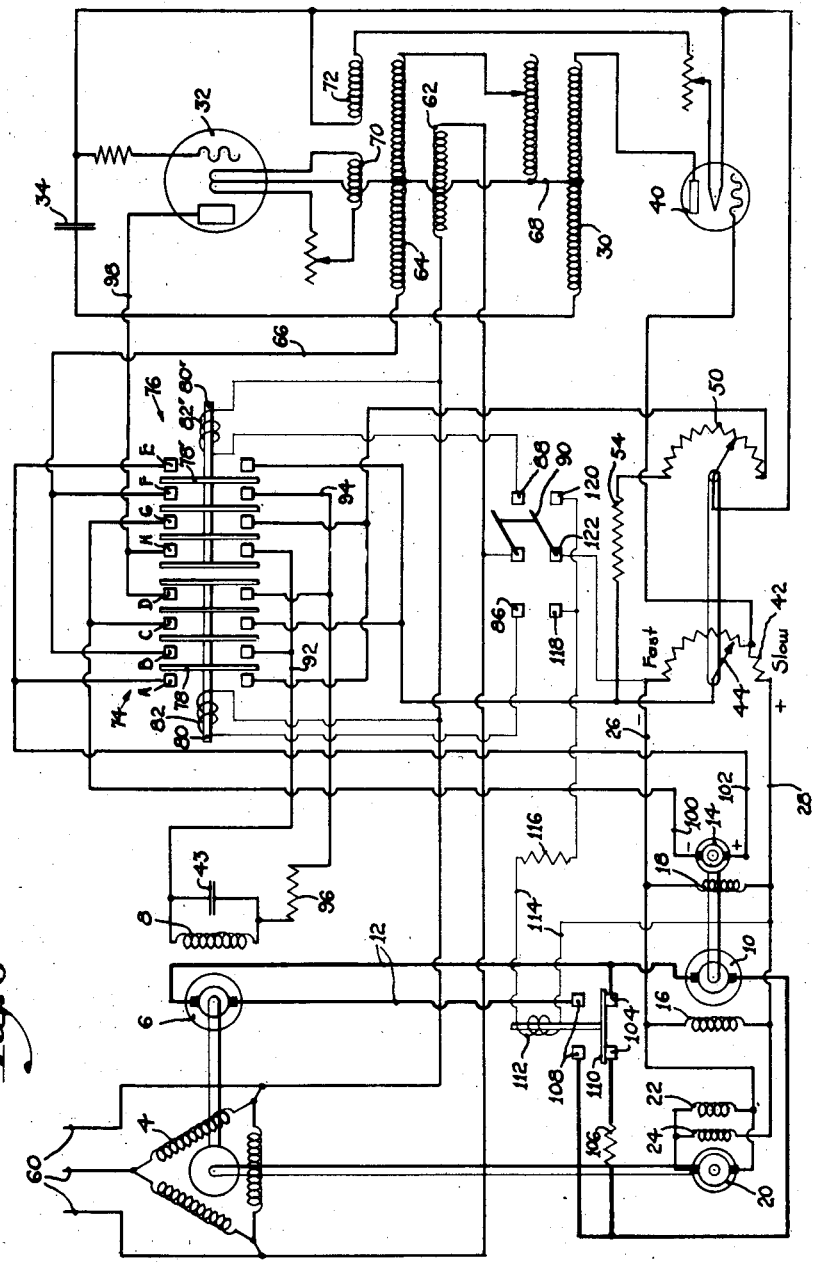

June 7, 1938.  I. O. MINER  2,119,715
MOTOR CONTROL
Filed May 24, 1932  2 Sheets-Sheet 1
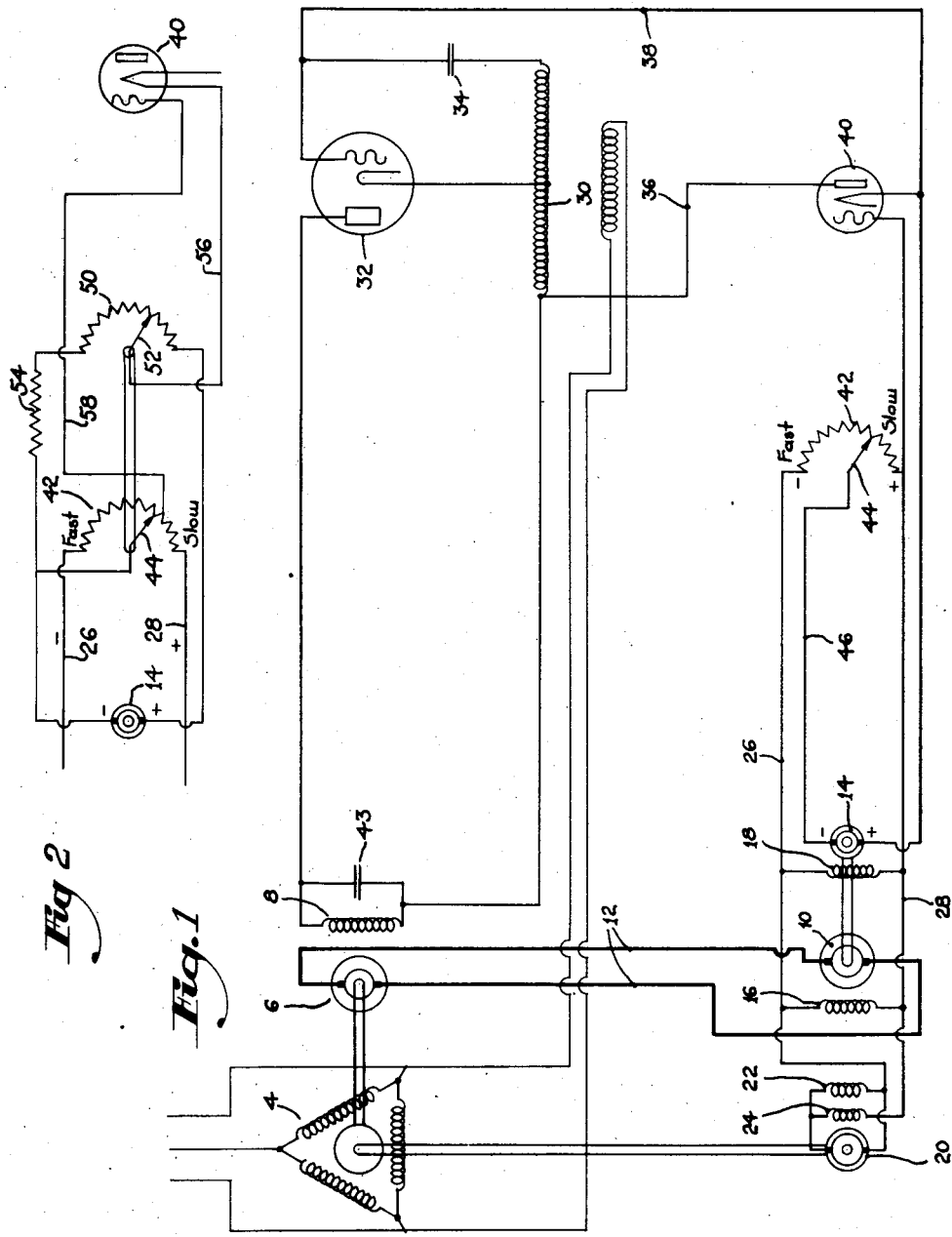

June 7, 1938.　　　　I. O. MINER　　　　2,119,715
MOTOR CONTROL
Filed May 24, 1932　　　2 Sheets-Sheet 2

Patented June 7, 1938

2,119,715

UNITED STATES PATENT OFFICE 2,119,715

MOTOR CONTROL

Irving O. Miner, Providence, R. I., assignor to Brown & Sharpe Manufacturing Company, Providence, R. I., a corporation of Rhode Island Application May 24, 1932, Serial No. 613,203

22 Claims. (Cl. 172—239)

The present invention relates to motor controls and more particularly to speed controls for electric motors.

The principal object of the present invention is to provide an inexpensive motor control which can not only be operated for any predetermined motor speed, but which will regulate the motor to a substantially constant speed at any setting regardless of changes of load.

Another object of the invention is to provide a control to effect immediate reversal of rotation of the motor without injury to the motor or associated apparatus.

It has been proposed to provide a constant speed motor control operating upon the supply of rectified alternating current to the armature of the motor, variations in the operation of the rectifier being effected by changes in the speed of the motor. Such a control has a number of disadvantages, particularly in that it requires rectifying apparatus of inordinately large size and expense. Moreover, its operation in causing sudden and immediate changes of the load current upon changes in speed may be attended with shock to the motor and rectifier, with consequent danger of injury thereto.

With the above and other objects in view, as will hereinafter appear, one feature of the present invention comprises controlling means acting upon variations in the motor speed for indirectly effecting compensating changes in the energy delivered to the motor. The indirect control is conveniently accomplished by varying a field current and in the best and most effective form of the invention yet devised, the supply of field current to a driving generator is automatically controlled in accordance with the variations in motor speed.

The invention also contemplates a supplementary or a superposed manual control by which the field current may be adjusted to regulate for any predetermined motor speed over a wide range, while permitting the automatic control to operate for causing compensating changes in the supply of energy to the motor upon any variations from the predetermined speed.

According to the present invention, the control apparatus and the associated circuits may be of relatively simple form and small size, since they are required to carry only the field current which is only a small fraction of the armature or load current. Moreover, although the control operates with sufficient rapidity for all practical mechanical drives, the rate of variation under changing conditions is limited by the electrical inertia introduced by the inductance of the field circuit so that electrical or mechanical injury to any part of the system is avoided. This feature of limiting the rate of current variation makes the present invention particularly suitable for control of reversal of the motor. Reversal, even under load, may be effected almost instantaneously, the apparatus being safeguarded by the small time lag necessary for building up the field current.

Other features of the invention relate to certain details of the control mechanism and other novel features of construction hereinafter described and particularly defined in the claims.

In the accompanying drawings, Fig. 1 is a diagram of a variable speed drive embodying the features of the present invention; Fig. 2 is a diagram of a modified control arrangement; and Fig. 3 is a diagram of a modified embodiment of the invention.

Referring to Fig. 1, a driving motor 4, illustrated as a three-phase induction motor, is directly connected to the armature 6 of a direct current generator which has a separately excited field 8. The generator 6 is electrically connected to the armature of a direct current motor 10 by wires 12. The motor 10 is the main driving motor, the speed of which is to be controlled. The motor 10 may be connected to drive any desired load. The motor 10 drives a small direct current pilot generator 14, the voltage of which is directly dependent upon the speed of the motor. The motor 10 and the pilot generator 14 have separately excited fields 16 and 18 respectively, which are energized by a constant voltage compound generator 20 driven at constant speed by the induction motor 4. The generator 20 has a shunt field 22 and a series field 24 and is connected to energize the fields 16 and 18 by wires 26 and 28.

The speed of the main driving motor 10 is controlled by varying the field current through the field winding 8 of the direct current generator 6. Field current is supplied to the winding 8 as rectified impulses from the secondary of a transformer 30 through an arc discharge tube 32, preferably of the thyratron type. As shown in the drawings, one end of the field winding is connected to the transformer and the other end to the plate of the thyratron tube. The filament of the tube, which is energized in a suitable manner, is connected to the mid-point of the transformer secondary 30. The grid potential of the tube is controlled by the common variable impedance phase-shifting circuit, whereby regulated amounts of energy may be delivered from the transformer through the plate circuit to the field. The phase-shifting circuit comprises a condenser 34 connected between one end of the transformer and the grid and a variable resistance connected between the other end of the transformer and the grid through wires 36 and 38. For convenience of control, the variable resistance preferably comprises the plate circuit of a three-element thermionic tube 40, the wire 36 being connected to the plate and the wire 38 being connected to the filament thereof. Variations in resistance are occasioned by variations in the grid potential of the tube 40. By this arrangement, impulses of substantially constant magnitude but of varying phase are impressed on the grid of the thyratron and this action serves to initiate the arc discharge at a variable point in each cycle, the variation in average energy delivered to the field being therefore dependent upon the magnitude of the resistance included in the plate circuit of the tube 40. A condenser 43 is connected across the field 8 to absorb the energy stored in the inductive field during the half-cycle in which the thyratron is inactive.

With the thyratron connections as illustrated, a decrease in the plate resistance of the tube 40 (effected by an increase in the grid potential) results in an increase of current delivered to the generator field 8. Conversely, an increase in plate resistance effected by a decrease in grid potential results in a diminution of current delivered to the generator field 8.

Variations in grid potential of the tube 40 and consequently variations in the amount of current delivered to the field 8 are effected by a dual control dependent on a manually controlled voltage and a superposed speed-controlled voltage generated by the pilot generator 14. The positive lead 28, which leads from the constant voltage generator 20, connects with the grid of the tube 40. A potentiometer 42 is connected between the leads 26 and 28 and hence has impressed upon it the full voltage generated by the constant voltage generator 20. A manually controlled variable contact 44 of the potentiometer is connected by the wire 46 with the negative terminal of the pilot generator 14, the positive terminal of which is connected to the filament of the tube 40.

It will be seen that the potentiometer and pilot generator connections form a control circuit which includes two component series voltages, namely, a manually adjustable voltage which remains constant for any setting of the potentiometer, and a variable voltage generated by the pilot generator and of a magnitude substantially proportional to the motor speed. These two components are normally in opposition, so that when the motor is operating under equilibrium conditions (that is, under substantially uniform load and speed), the resultant potential impressed on the grid is confined within a narrow working range. The actual limits of the working range of grid potential are not required to be very great; with tubes of ordinary construction, the complete range of thyratron control may be effected by varying the grid potential of the tube 40 between minus 5 and plus 5 volts. This example is merely illustrative, the actual working range in any case being dependent on the characteristics of the tube and the associated circuits.

Although the grid potential under equilibrium conditions is confined within a narrow range, the actual potential under changing conditions may be considerably greater. Thus, if the potentiometer is set for high speed and the motor is started from rest, the voltage initially impressed on the grid of the tube 40 will be 110 volts (assuming this to be the value of the voltage generated by the generator 20). The variable voltage generator 6 then generates its full voltage and the motor 10 is brought quickly up to its maximum speed. As the speed rises, the voltage of the pilot generator 14 rises in opposition to the potentiometer voltage until equilibrium conditions are ultimately reached, when the actual grid potential on the tube 40 will lie in the narrow working range. In any case, the resultant grid potential ultimately adjusts itself to a value to cause the thyratron to deliver the proper field current for maintaining the load at the speed determined by the potentiometer setting.

For any desired operating speed, there is one setting of the contact arm 44. When this setting has been made, the motor 10 will regulate to a substantially constant speed regardless of changes of load. Regulation of speed is dependent on variations in voltage of the pilot generator 14. For example, if the load is suddenly increased, tending to slow down the motor, the negative voltage generated by the pilot generator decreases, thereby increasing the positive potential on the grid of the tube 40, and increasing the current delivered to the generator field 8. This compensating effect under the influence of the pilot generator is particularly advantageous at low speed settings, at which the regulation of any motor is inherently poor.

The regulation of the motor depends upon the sensitivity of the grid potential control, which in turn depends upon the variation of pilot generator voltage upon any change of speed of the driving motor 10. It is desirable to effect as large a variation as possible in the pilot generator voltage upon any change of speed. Accordingly, the higher the voltage generated by the pilot generator, the better will be the regulation of the motor 10. In the diagram of Fig. 1, a pilot generator capable of generating 550 volts at full speed would give approximately five times as good speed regulation as a 110 volt generator, but a 550 volt pilot generator would have to work in conjunction with a constant voltage generator 20 capable of generating approximately 550 volts, since the voltages are in approximate balance under equilibrium conditions. It has been noted that although the grid of the tube 40 is never subjected to wide variations of potential under equilibrium conditions, nevertheless it may, under transition conditions, while the motor is accommodating itself to a new setting, be subjected to potentials as great as the full voltage of the generator 20. A high voltage control would therefore not be feasible with ordinary tubes which are unable to withstand grid potentials of more than about 150 volts. Accordingly, the diagram of Fig. 1 is limited to a construction in which the maximum available voltages are not greater than the safe grid potentials that can be applied to the tube 40.

To permit a greater sensitivity of control, particularly at low speed settings, the potentiometer arrangement shown diagrammatically in Fig. 2 is preferred. In this arrangement, the potentiometer 42 and its sliding contact arm 44 are as shown in Fig. 1, this potentiometer being connected between the constant voltage lines 26 and 28. The pilot generator 14, which is designed for high voltage at its full speed, is connected across a second potentiometer 50 having a sliding contact arm 52. The arms 44 and 52 are connected to move in unison. A fixed resistance 54 is placed in series with the potentiometer 50. The negative terminal of the pilot generator 14 is connected to the contact arm 44. The filament of the tube 40 is connected by a wire 56 with the movable arm 52 of the potentiometer 50. The grid of the tube may be connected to the positive end of the potentiometer 42, as in the construction of Fig. 1, but for a purpose presently to be described, is preferably connected to an intermediate point of the potentiometer by a wire 58. It will be seen that as the contact arms are moved, a variable voltage from the potentiometer 42 is impressed on the grid of the tube 40 in substantially the same manner as in the arrangement of Fig. 1. However, only a portion of the pilot generator voltage 14 is included in the grid circuit, the magnitude thereof depending upon the setting of the contact arm 52. If the contact arm 52 is placed at the upper or negative end of the potentiometer for high speed operation, the only part of the pilot generator voltage included in the grid circuit is the voltage drop across the resistance 54, which is insufficient to cause injury to the tube 40. Under high speed conditions, the full effect of variations in pilot generator voltage is not necessary because the regulation of the motor 10 is then inherently good.

For low speed settings, wherein the contact arms 44 and 52 are placed near the positive ends of their potentiometers, nearly all of the pilot generator voltage is included in the grid circuit. Although the inherent regulation of the motor 10 at low speed settings is poor, any change of speed following a change of load produces a considerably greater swing in grid potential than would be obtained in the construction of Fig. 1. This results in more quickly and accurately restoring the motor speed to its former value. However, since the pilot generator voltage is proportional to the speed, the maximum grid potential, even under transition conditions, is insufficient to damage the tube.

It will be seen, therefore, that the double potentiometer permits the use of a pilot generator capable of generating a relatively high voltage, which at full speed is preferably several times the constant voltage between the lines 26 and 28. At high speed settings at which the inherent motor regulation is good, the full effect of the pilot generator voltage is unnecessary and would in fact be a source of danger to the tube, but at these setting the voltage is reduced to a safe value by the potentiometer 50. For low speed settings at which the regulation of the motor is inherently poor, the full effect of variations in the pilot generator voltage on changes in speed is availed of to control the operation of the thyratron. In any case, the motor will regulate automatically to a speed determined by the setting of the potentiometers.

Referring to the connection of the grid wire 58 to an intermediate point of the potentiometer 42, this connection is used to permit the application of negative potentials to the grid for low speed settings of the potentiometer. With some tubes, the grid connection of Fig. 1 does not permit a sufficiently low potential to be impressed on the grid for extremely low speed operation. The minimum speed at which it is desired to operate the motor can be controlled by the proper connection of the grid wire 58 to the potentiometer, as shown in Fig. 2, so that at low speed settings, a continuous negative potential of considerable magnitude is applied to the grid.

The arrangement shown in Fig. 3 embodies the features shown in Figs. 1 and 2, and incorporates some additional features particularly with relation to a control for reverse operation of the motor 10. The present invention is particularly well adapted to motor reversal without damage to any of the apparatus because of the time lag in the building up of the generator field current following an interruption.

The complete circuit diagram is illustrated in Fig. 3, in which the alternating current driving motor 4, the direct current generator 6 and its field 8, the constant voltage generator 20 and its fields 22 and 24, the main driving motor 10 and its field 16, and the pilot generator 14 and its field 18, as well as the mechanical connections between these units, are as illustrated in Fig. 1. The thyratron tube 32 with the phase-shifting circuit including the condenser 34 and the tube 40 are also as illustrated in Fig. 1. The motor 4 is driven from a three-phase line 60, two lines of which connect with the primary 62 of the transformer for energizing the thyratron tube. The transformer has a secondary 64, the mid-point of which is connected to the filament of the thyratron and one end of which is connected by a wire 66 into the plate circuit. The secondary 64 is connected at the other end to the variable primary of a transformer 68, the secondary of which corresponds to the transformer 30 of Fig. 1 and which supplies current to the phase-shifting circuit. The primary 62 is also associated with the secondary 70 to energize the filament of the thyratron and the secondary 72 to energize the filament of the thermionic tube 40.

The control is effected through the double potentiometer arrangement as in Fig. 2.

Two normally open reversing relays 74 and 76 are provided. The relay 74 has four sets of stationary double contacts A, B, C and D. The relay 76 has similar contacts E, F, G and H. Associated with each pair of stationary contacts of the relay 74 is the movable bridge contact 78, the four bridge contacts of the relay being mounted on a rod 80 magnetically controlled by a solenoid 82. Similarily the relay 76 has bridge contacts 78', a rod 80', and a solenoid 82'. The bridge contacts are normally maintained in the inactive positions indicated in Fig. 3 by any suitable means, and are adapted to be moved either to the left or right respectively for closure of their contacts by means of the solenoids. One end of each solenoid is connected to one of the lines 60. The other ends of the solenoids are connected respectively to the contacts 86 and 88 of the double throw reversing switch 90, the center contact of which is connected to one of the lines 60. When the switch 90 is closed in its left-hand position, the separate bridge contacts of the relay 74 are closed on the contacts A, B, C and D, while when the reversing switch is closed in its right-hand position, the bridge contacts of the relay 76 are closed on the stationary contacts E, F, G and H.

The plate circuit of the thyratron tube is traced from the secondary 64 through the wire 66 to the contacts B and F of the relays 74 and 76. The lower contact B connects by a wire 92 with the upper end of the field coil 8, while the lower contact F of the relay 76 connects by a wire 94 with the lower end of the field through a resistance 96, the purpose of which will be hereinafter described. The wire 92 also connects with the lower contact H of the relay 76 and the wire 94 connects with the lower contact D of the relay 74.

The upper contacts D and H connect with the plate of the thyratron tube through a wire 98. It will be seen, therefore, that upon closure of the relay 74, the field circuit is energized in one direction and upon closure of the relay 76, the field is energized in the opposite direction.

The remaining contacts of the reversing relays are connected between the pilot generator 14 and the potentiometers whereby the pilot generator voltage as applied in the grid circuit is always maintained in the same direction regardless of the direction of rotation of the motor. Accordingly, the negative pilot generator lead 100 connects through the contacts C or G with either the contact arm 44 or the positive end of the potentiometer 50, while the other lead 102 connects through either the contacts A or E with the same points.

In order that the motor 10 may be brought quickly to rest in the interval of time required for throwing the reversing switch 90, a dynamic brake relay is provided by which the motor armature is temporarily short-circuited. This relay comprises a pair of stationary contacts 104, one of which is connected to one of the leads 12 leading from the generator 6 to the motor 10 and the other of which is connected through a current limiting resistance 106 with the motor. The generator is adapted to be electrically connected to the motor through a pair of contacts 108. Either pair of contacts 104 and 108 is adapted to be closed by a bridge contact 110 operated by a solenoid 112 which is energized by wires 114 from the output leads 26 and 28 of the constant voltage generator 20. One of the leads 114 includes a resistance 116 and is connected to two contacts 118 and 120 of the reversing switch 90, the middle contact 122 thereof being connected to the wire 26. The bridge contact 110 is closed on the brake contacts 104 whenever the switch 90 is open but is adapted to be moved upwardly into engagement with the contacts 108 when the switch 90 is closed in either position.

Assuming that the motor is operating in normal direction with the switch 90 closed on its left-hand contacts, the system operates as above described, the circuit between the generator 6 and the motor 10 being closed between the contacts 108. Under these conditions, the negative lead 100 from the pilot generator 14 is connected through the contacts C with the movable arm 44 in the same manner as shown in Fig. 2, while the lead 102 is connected through the contacts A with the positive end of the potentiometer 50. To reverse the motor, the switch 90 is thrown to its right-hand position. In the interval required for throwing the switch, the dynamic relay contacts 104 are closed, thereby short-circuiting the motor 10 and bringing it quickly to rest. Upon closure of the switch in its right-hand position, the relay is again operated to close the active contacts 108. At the same time, the direction of current supplied to the generator field 8 is reversed, thereby reversing the generator voltage and the direction of rotation of the motor 10. Likewise, the connections of the pilot generator 14 are reversed so that potentials in the grid circuit are unchanged in direction. If the potentiometer controls are maintained at the same point, the motor will regulate for the same speed in reverse as in the normal direction. Proper regulation of motor speed under varying load conditions is maintained in exactly the same manner for normal and reverse directions.

Sudden reversal of the motor without injury is permitted because of the inertia of the plate circuit of the thyratron due to the inductance of the generator field circuit. Thus, the generator field current is caused to build up slowly without damage to the thyratron and likewise the voltage of the generator 6 builds up fairly slowly, thereby preventing damage to either the motor or the generator. The time interval necessary for building up of the generator voltage depends on the time constant of the field circuit and hence may be regulated by adjustment of the characteristics thereof. A highly inductive circuit which has a large time constant causes a comparatively slow building up of the current. In general, the time constant of the generator field 8, owing to the inductance thereof, is usually sufficient, and in many instances, is susceptible of reduction without danger of injury to the apparatus. Reduction of the time constant may be accomplished by the use of a series resistance, and this is, in fact, the purpose of the resistance 96, the value of which may be set to cause building up of the current at any desired rate. For large motors operating under heavy loads, a fairly large time constant is desirable and the resistance 96 may be small or may be omitted altogether, but for small machinery, a resistance of considerable magnitude with relation to the inductance of the field may be employed, to diminish the time constant to a small value. It will be appreciated that for maximum protection of the driven machinery, the time constant should be as small as possible consistent with safety of operation of the apparatus.

The present invention is useful for any service requiring variable speed with close regulation and is particularly suitable for machine tools such as milling machines, planers, and the like. With such machines, it is frequently necessary to vary the operating speed in accordance with the character of the work, but the speed for which the setting is made should be maintained irrespective of changes in the load. The capacity for immediate reversal is of especial value in effecting the return traverse of the tools.

The invention is simple and inexpensive in comparison with the usual regulating equipment for variable speed drives. The five rotary machines are of standard construction, and of these, only the induction motor 4 and the direct current generator 6 need be of a size comparable to the main driving motor 10. The constant voltage generator 20 and the pilot generator 14 are not required to carry any appreciable load and may be of small size.

One of the principal advantages of the present invention arises from the arrangement whereby the supply of energy to the motor 10 is controlled only indirectly. The rectifier is required to carry only the field current and may therefore have a rating of only about five per cent of that required in regulating apparatus that operates directly on the armature current. Aside from the saving in the use of equipment of small size, the indirect control has a further and more important advantage that through the inductance of the field circuit, it limits the rate of any change to prevent injury of the apparatus, while permitting variation or reversal of speed with sufficient rapidity for any mechanical drive.

Having thus described the invention, what is claimed is:

1. The combination with a motor, of a generator therefor, a field circuit, an arc discharge tube for delivering rectified current to the field circuit, the tube having a control element, a phase-shifting circuit associated with the control element, a control circuit for controlling the phase of currents in the phase-shifting circuit, and a pilot generator driven by the motor and electrically connected in the control circuit.

2. The combination with a motor, of a generator therefor, a field circuit, an arc discharge tube for delivering rectified current to the field circuit, the tube having a control element, a phase-shifting circuit associated with the control element, a control circuit, means for impressing in the control circuit a variable voltage dependent on the motor speed, and a supplemental source of adjustable voltage in the control circuit, the phase of currents in the phase-shifting circuit being controlled by the resultant control circuit voltages.

3. The combination with a motor, of a generator, a field circuit, an arc discharge device to deliver rectified current to the field circuit, the arc discharge device having a control element, a phase-shifting circuit associated with the control element, a control circuit, means for impressing in the control circuit a voltage having a constant component and a variable component, the latter dependent on the motor speed, means for manually adjusting the constant component, and means for shifting the phase of currents in the phase-shifting circuit in accordance with the resultant voltage in the control circuit to vary the field current.

4. The combination with a motor, of a rectifier, means controlled by the rectifier for supplying energy to the motor, a control circuit including a source of substantially constant voltage, an adjustable potentiometer associated with said source, a variable voltage pilot generator driven by the motor and arranged to generate at full speed a voltage greater than said constant voltage, means for placing in series with the adjustable potentiometer voltage an adjustable proportion of the pilot generator voltage, and means responsive to the resultant voltage to control the rectifier.

5. The combination with a motor, of a rectifier, means controlled by the rectifier for supplying energy to the motor, a control circuit including a source of substantially constant voltage, an adjustable potentiometer associated with said source, a variable voltage pilot generator driven by the motor and arranged to generate at full speed a voltage greater than said constant voltage, an adjustable potentiometer across the pilot generator, means for placing the potentiometer voltages in series, and means responsive to the resultant voltage to control the rectifier.

6. The combination with a motor, of a generator therefor having a separately excited field, a rectifier for exciting the field having a control element, a phase-shifting circuit associated with the control element, a thermionic tube having its plate circuit as a variable resistance in the phase-shifting circuit, and a control circuit having a source of voltage dependent on the motor speed and a source of adjustable voltage, the control circuit being connected to the thermionic tube to control the plate resistance thereof and thereby to control the current supplied to the field.

7. The combination with a motor, of a generator therefor having a separately excited field, a rectifier for exciting the field having a control element, a phase-shifting circuit associated with the control element, a thermionic tube having its plate circuit as a variable resistance in the phase-shifting circuit, means for impressing on the grid of the thermionic tube an adjustable potential, means for impressing on the grid a variable potential dependent on the speed of the motor, the resultant potential controlling the phase-shifting circuit and thereby controlling the field current.

8. The combination with a motor, of a generator therefor having a separately excited field, a rectifier for exciting the field having a control element, a phase-shifting circuit associated with the control element, a thermionic tube having its plate circuit as a variable resistance in the phase-shifting circuit, a control circuit having a source of constant voltage, means for impressing an adjustable portion of said voltage on the grid of the tube, and a source of variable voltage opposing the adjustable voltage, said variable voltage being dependent on the speed of the motor.

9. The combination with a motor, of a generator therefor having a separately excited field, a rectifier for exciting the field having a control element, a phase-shifting circuit associated with the control element, a thermionic tube having its plate circuit as a variable resistance in the phase-shifting circuit, a control circuit including a source of constant voltage and a potentiometer for impressing an adjustable portion of said voltage on the grid of the tube, and a source of variable voltage dependent on the motor speed and in series with said adjustable voltage, the plate resistance of the tube being dependent on the resultant control circuit voltage and thereby controlling the field current delivered by the rectifier.

10. The combination with a motor, of a rectifier for controlling the supply of energy to the motor, a control circuit including a source of substantially constant voltage and a source of voltage dependent on the speed of the motor, a voltage divider associated with each source, means responsive to the resultant control circuit voltage to affect the operation of the rectifier, and means for adjusting the voltage dividers to increase the proportion of one voltage while reducing the proportion of the other in the control circuit.

11. The combination with a motor, of a generator for supplying energy to the motor, a generator field circuit, a rectifier for delivering current to the field circuit, a control circuit including a pilot generator driven by the motor, means responsive to variations in pilot generator voltage to vary the field current supplied through the rectifier, and means for reversing the generator field current and for simultaneously reversing the pilot generator connections.

12. The combination with a motor, of an arc discharge tube, means controlled by the arc discharge tube for supplying energy to the motor, a control circuit including a source of manually variable voltage and a source of voltage depending in magnitude on the speed of the motor, said second source including a pilot generator driven by the motor and capable of generating a voltage in excess of the maximum voltage of said first source, the sources being connected in series opposition, means for manually varying the voltage of the first source having provision for simultaneously varying the control circuit voltage component due to the pilot generator, and means controlled by the resultant control circuit voltage for varying the operation of the rectifier.

13. The combination with a motor, of a generator for supplying energy thereto, a generator field circuit, a rectifier for energizing the generator field circuit, a control circuit including a source of adjustable voltage normally constant for any selected motor speed, and a pilot generator to generate a voltage varying in accordance with the actual motor speed, and means for increasing the normally constant voltage to change the motor speed, said means having provision for simultaneously reducing the effect of the pilot generator voltage, and means controlled by the resultant control circuit voltage to control the operation of the rectifier and the energization of the generator field.

14. The combination with a motor, of a generator therefor, an arc discharge tube having a control element, means for exciting the generator field entirely through the arc discharge tube and forming the sole means of varying the energy supplied to the motor by variations in the excitation, a control circuit for the control element including a source of manually adjustable constant voltage solely determining the speed at which the motor is to regulate and a source of variable voltage comprising a pilot generator driven by the motor, the two sources being connected in series, and means controlled by variations in the resultant control circuit voltage for affecting the control element of the arc discharge tube to control the supply of energy to the motor.

15. The combination with a motor, of a generator therefor, an arc discharge tube having a control element, means for exciting the generator field entirely through the arc discharge tube and forming the sole means of varying the energy supplied to the motor by variations in the excitation, a control circuit including two sources of voltage in series opposition, one source comprising a manually adjustable voltage source solely determining the speed at which the motor is to regulate and the other comprising a pilot generator driven by the motor, and means responsive to variations of the resultant control circuit voltage to affect the control element of the arc discharge tube and thereby to control the energy supplied to the motor.

16. The combination with a motor, of a source of energy for said motor, an arc-discharge tube for controlling the supply of energy to the motor, the tube having a control element, a thermionic tube having grid and plate circuits, an alternating current phase-shifting circuit for the control element of the arc-discharge tube, said phase-shifting circuit having as one part thereof the plate circuit of the thermionic tube, and means responsive to changes in speed of the motor to affect the grid circuit of the thermionic tube and thereby to vary the operation of the arc-discharge tube.

17. The combination with a motor, of a generator therefor, a generator field circuit, an arc-discharge tube for exciting the generator field, the tube having a control element, a thermionic tube having grid and plate circuits, an alternating current phase-shifting circuit for the control element of the arc-discharge tube, said phase-shifting circuit having as one part thereof the plate circuit of the thermionic tube, and means responsive to changes in speed of the motor to affect the grid circuit of the thermionic tube and thereby to vary the operation of the arc-discharge tube.

18. The combination with a motor, of a generator therefor having a separately excited field, a rectifier for exciting the field having a control element, a phase-shifting circuit associated with the control element, a thermionic tube having its plate circuit as a variable resistance in the phase-shifting circuit, and a control circuit having a source of voltage dependent on the motor speed and connected to the grid circuit of the thermionic tube to control the plate resistance thereof and thereby to control the current supplied to the field.

19. The combination with a motor, of a generator therefor, a field circuit, an arc discharge tube for delivering rectified current to the field circuit, the tube having a control element, a phase-shifting circuit associated with the control element and including a variable resistance, a control circuit including a pilot generator driven by the motor, and controlling the magnitude of the resistance to vary the supply of current to the field circuit.

20. The combination with a motor of a source of energy for the motor, an arc discharge tube for controlling the supply of energy to the motor, the tube having a control element, an alternating current phase-shifting circuit including a variable resistance associated with the control element, a control circuit including a pilot generator driven by the motor and a source of manually adjustable voltage, and means controlled by variations in the resultant control circuit voltage for varying the magnitude of the resistance to affect the control element of the arc discharge tube to vary the supply of energy to the motor.

21. The combination with a motor, of an arc discharge tube for controlling the supply of energy to the motor, the tube having a control element, a control circuit including a source of substantially constant voltage and a pilot generator to generate a voltage dependent on the motor speed, said pilot generator voltage being at full speed in excess of the constant voltage, a voltage divider associated with each source of voltage, means for simultaneously adjusting the voltage dividers to increase the proportion of one voltage and to reduce the proportion of the other voltage in the control circuit, and means responsive to the resultant control circuit voltage to affect the control element of the tube and thereby to vary the supply of energy to the motor.

22. The combination with a motor, of a generator therefor, a field circuit, an arc discharge tube having a control element, means for exciting the field circuit through the tube, a control circuit including a source of substantially constant voltage and a pilot generator to generate a voltage dependent on the motor speed, said pilot generator voltage being at full speed in excess of the constant voltage, a voltage divider associated with each source of voltage, means for simultaneously adjusting the voltage dividers to increase the proportion of one voltage and to reduce the proportion of the other voltage in the control circuit, and means responsive to the resultant control circuit voltage to affect the control element of the tube and thereby to vary the excitation of the field circuit.

IRVING O. MINER.